(12) United States Patent
Van Puyvelde

(10) Patent No.: US 12,408,591 B2
(45) Date of Patent: Sep. 9, 2025

(54) DEVICE AND METHOD FOR HARVESTING TEXTILE HEMP

(71) Applicant: CRETES NV, Gullegem (BE)

(72) Inventor: Dirk Van Puyvelde, Gullegem (BE)

(73) Assignee: CRETES NV, Gullegem (BE)

( * ) Notice: Subject to any disclaimer, the term of this patent is extended or adjusted under 35 U.S.C. 154(b) by 864 days.

(21) Appl. No.: 17/622,346

(22) PCT Filed: Jul. 2, 2020

(86) PCT No.: PCT/IB2020/056248
§ 371 (c)(1),
(2) Date: Dec. 23, 2021

(87) PCT Pub. No.: WO2021/005466
PCT Pub. Date: Jan. 14, 2021

(65) Prior Publication Data
US 2022/0240447 A1   Aug. 4, 2022

(30) Foreign Application Priority Data

Jul. 5, 2019   (BE) .................................. 2019/5432
Oct. 11, 2019   (BE) .................................. 2019/5685

(51) Int. Cl.
*A01D 45/06* (2006.01)
*A01D 57/20* (2006.01)

(52) U.S. Cl.
CPC ........... *A01D 45/065* (2013.01); *A01D 57/20* (2013.01)

(58) Field of Classification Search
CPC ...... A01D 45/065; A01D 57/20; A01D 45/06; A01D 91/04
See application file for complete search history.

(56) References Cited

U.S. PATENT DOCUMENTS

| | | | | |
|---|---|---|---|---|
| 703,328 | A * | 6/1902 | Whitely | A01D 39/00 56/471 |
| 1,365,955 | A * | 1/1921 | Scranton | A01D 45/10 56/192 |
| 2,401,513 | A * | 6/1946 | Schmidt | A01D 47/00 56/238 |
| 2,790,290 | A * | 4/1957 | Tufford | A01D 43/10 56/192 |
| 2,823,510 | A * | 2/1958 | Grasswick | A01D 57/20 56/192 |

(Continued)

FOREIGN PATENT DOCUMENTS

| | | | | |
|---|---|---|---|---|
| CA | 3210194 A1 * | 2/2024 | | A01D 34/24 |
| CN | 201315753 Y | 9/2009 | | |

(Continued)

OTHER PUBLICATIONS

ISR-WO dated Oct. 1, 2020 for parent application PCT/IB2020/056248.

*Primary Examiner* — Arpad Fabian-Kovacs
(74) *Attorney, Agent, or Firm* — Vorys, Sater, Seymour and Pease LLP

(57) ABSTRACT

Devices and methods of harvesting textile hemp are presented. The methods comprise mowing the hemp and wherein the cut stems are held between crossed conveyor belts and then rotated 90° from vertical to horizontal, taken over one or more times by other belts, to be deposited in parallel swaths on the field.

13 Claims, 3 Drawing Sheets

(56) References Cited

U.S. PATENT DOCUMENTS

| | | | | |
|---|---|---|---|---|
| 3,399,517 | A * | 9/1968 | Magee | A01D 47/00 56/238 |
| 3,596,448 | A * | 8/1971 | Van Buskirk | A01D 45/021 56/95 |
| 4,715,174 | A * | 12/1987 | Lloyd | A01D 75/00 56/297 |
| 5,463,857 | A * | 11/1995 | Blosser | A01D 34/035 56/238 |
| 5,600,943 | A * | 2/1997 | Ryan | A01D 34/661 56/2 |
| 5,632,135 | A * | 5/1997 | Baker, IV | A01D 45/065 460/24 |
| 6,119,443 | A * | 9/2000 | Rauch | A01D 45/021 56/64 |
| 6,837,034 | B1 * | 1/2005 | Krone | A01D 65/00 56/51 |
| 9,554,510 | B2 * | 1/2017 | Nürnberg | A01D 41/14 |
| 2005/0050875 | A1 * | 3/2005 | Alsobrook | A01D 33/10 56/327.1 |
| 2016/0183462 | A1 * | 6/2016 | Magisson | A01D 41/14 56/192 |
| 2018/0014462 | A1 * | 1/2018 | Borry | A01D 41/142 |
| 2020/0253120 | A1 * | 8/2020 | Hefner | A01D 34/42 |
| 2023/0026343 | A1 * | 1/2023 | Dillon | A01D 34/14 |
| 2024/0276918 | A1 * | 8/2024 | Baert | A01D 69/03 |

FOREIGN PATENT DOCUMENTS

| | | | | |
|---|---|---|---|---|
| CN | 110892819 | A * | 3/2020 | A01D 41/02 |
| CN | 112425349 | A * | 3/2021 | A01D 37/00 |
| DE | 2418995 | C2 * | 10/1990 | A01D 41/06 |
| DE | 19744988 | A1 | 4/1999 | |
| DE | 10042867 | A1 * | 3/2002 | A01D 45/065 |
| EP | 0941649 | A2 | 9/1999 | |
| EP | 1623617 | A1 | 2/2006 | |
| EP | 3272202 | A1 | 1/2018 | |
| FR | 2730126 | B1 * | 4/1997 | A01D 41/06 |
| FR | 2885009 | A1 | 11/2006 | |
| FR | 3066881 | A1 | 12/2018 | |
| JP | H09154369 | A * | 6/1997 | A01D 49/00 |
| WO | WO-9853660 | A1 * | 12/1998 | A01D 41/14 |
| WO | WO-0105218 | A1 * | 1/2001 | A01B 73/044 |
| WO | 2001/039590 | A1 | 6/2001 | |
| WO | WO-2009095763 | A2 * | 8/2009 | A01D 45/10 |
| WO | WO-2020261177 | A1 * | 12/2020 | A01D 43/08 |
| WO | 2021/005466 | A1 | 1/2021 | |
| WO | WO-2023187767 | A1 * | 10/2023 | A01D 45/065 |

* cited by examiner

DEVICE AND METHOD FOR HARVESTING TEXTILE HEMP

TECHNICAL FIELD

The Invention relates to a device and method for harvesting textile hemp.

PRIOR ART

Hemp is a plant that is grown for fibre yield. Fibres are extracted from the stems. However, the seeds can also be used for industrial applications.

Traditional harvesting techniques in which hemp is cut and bundled into separate sheaves are very labour intensive. In addition, hemp plants can grow to great lengths. Lengths of two, up to four metres and longer are no exception. Hemp bundled into such long sheaves is unmanageable. The sheaves risk breaking/folding, with the result that they can no longer be processed at a later stage.

Hemp is therefore usually cut from the stem and subsequently chopped. The chaff is laid out in swaths for further drying and retting. The dried swaths are then picked up by machine and further processed. Such methods are very efficient and not very labour-intensive. An important drawback, however, is that the fibres are greatly shortened, to just a few centimetres. Another possible drawback is the loss of seeds.

More advanced techniques and machines for harvesting textile hemp are known in the art:

EP 0 941 649, for example, describes the mowing of upright hemp. Different parts of the plant (e.g. the leaf-free lower stems, the upper stems with leaves, and the tops with seeds) are kept separate. These plant parts are crushed separately and dumped into a disordered swath. An advantage is that such swaths are slightly airier. The drying is therefore slightly better.

DE 100 42 867 describes a similar method in which the hemp is mown via sets of two mowing discs, at different heights.

WO 2001 039 590 also describes a machine for harvesting hemp. The hemp is cut upright via cutting blades in the front. The cut hemp is clamped and transported according to the direction of travel. The hemp thus ends up on a transverse needle belt conveyor. This guides the hemp in a transverse direction along two circular saws. The hemp is therefore cut into three pieces. Lower stem parts and upper stem parts are turned by sliders and placed transversely to the direction of travel. Tops are removed via a conveyor belt. For example, they are poured on top of the deposited stem parts for better drying.

As a drawback, the known techniques and machines do not sufficiently address the above-mentioned problems. Often, they are also extraordinarily complex, which makes them subject to machine failure.

To make it possible to obtain long fibre (>500 mm) in the later processing, it is necessary to adjust the harvesting method.

Currently, hemp is harvested with either a chaff cutting machine, shortening the stems and depositing them randomly in swaths on the field, or with a mowing machine, but still insufficiently parallelised for the mechanical and automated further processing.

Apart from the above, there are also known machines for fibre flax harvesting. DE 197 44 988, for example, describes a machine in which the flax is pulled up, turned through 90°, and then laid back down in a swath. EP 3 272 202 also shows a self-propelled machine for harvesting fibre flax. Fibre flax is usually pulled up for maximum yield of fibre-containing material. Namely, the fibres continue into the root parts. Fibre flax is also a fairly short crop, with a length of up to 1 m to 1.2 m.

The object of the invention is an improved method and/or device for harvesting textile hemp. Thus, it is sought is to remedy one or more of the above problems. In particular, a maximum performance is aimed for, with a maximum quality (including length) of the fibres obtained.

SUMMARY OF THE INVENTION

The invention relates to a method according to claim 1, and a device according to claim 14, for harvesting textile hemp.

An important advantage is that the hemp is cut from the stem, optionally at different heights, and that the stem parts are laid parallel to each other in an ordered swath. This is advantageous for drying, retting, and further operations.

Preferably, the hemp is cut at different levels in a vertical position (claim 4) and approximately simultaneously (claim 5). Optionally, the hemp is cut by means of multiple, horizontal cutting bars at corresponding cutting heights. Optionally, it concerns double knife bars.

DETAILED DESCRIPTION

Figure 1:
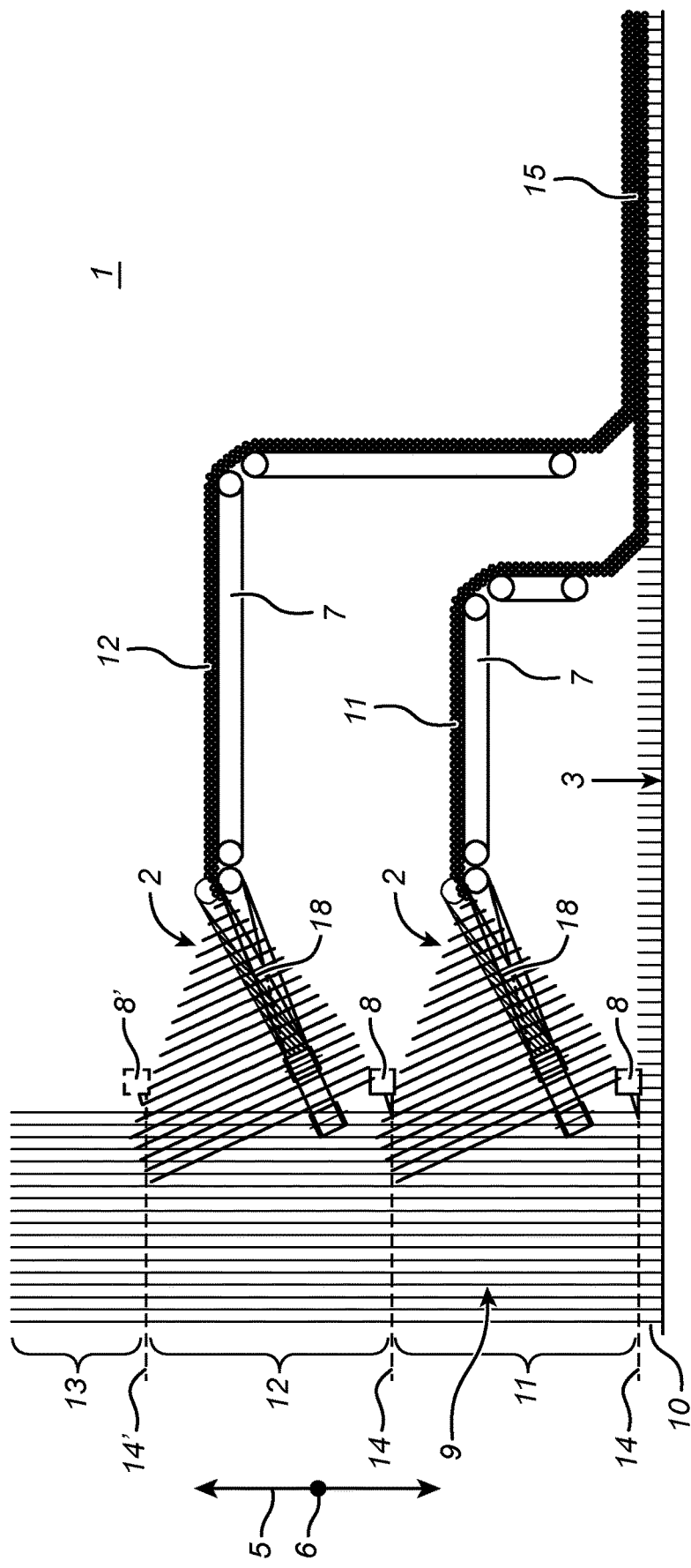
FIG. 1 shows a possible embodiment of a device according to the present invention.

The invention relates to a device and method for harvesting textile hemp.

Unless otherwise defined, ail terms used in the description of the invention, including technical and scientific terms, have the meaning as commonly understood by a person skilled in the art to which the invention pertains. For a better understanding of the description of the invention, the following terms are explained explicitly.

In this document, 'a' and 'the' refer to both the singular and the plural, unless the context presupposes otherwise. For example, 'a segment' means one or more segments. The terms 'comprise', 'comprising', 'consist of', 'consisting of', 'provided with', 'have', 'having', 'include', 'including', 'contain', 'containing' are synonyms and are inclusive or open terms that indicate the presence of what follows, and which do not exclude or prevent the presence of other components, characteristics, elements, members, steps, as known from or disclosed in the prior art.

The term 'swath' can refer to a strip of crops that is returned to the harvesting site during harvesting (e.g. in the field). For example, crops are laid in swaths to allow the crops to dry and/or ret.

In a first aspect, the invention relates to a method of harvesting textile hemp, the method comprising mowing the hemp, wherein mown hemp stems are rotated about 90° from vertical to horizontal, and the hemp stems are deposited substantially transversely and mutually parallel in at least one swath. Preferably, this concerns a swath with cut/mowed, parallelised hemp stems.

An important advantage of the transverse arrangement in swaths is that natural processes such as drying and retting take place very efficiently. Incidentally, retting means that part of the pectin in the stems is broken down and that the actual fibres can be partially separated from the woody parts. This is also advantageous for further operations such as turning and picking up the swaths. These operations can now be carried out partly in the same way as with flax (albeit with the necessary adjustments to the machines).

However, an important difference is that flax traditionally does not have its stem cut, but rather is pulled up. In this way, the fibres can also be recovered, which run into the root parts. Flax is also a much shorter crop. Typically, swaths of long hemp stems would therefore be difficult to handle, especially when using traditional flax machines (for turning, picking up, etc.). Because flax is 'pulled up', the mouth of a flax harvester is usually very heavily built. Among other things, the belts must be able to pull the flax out of the ground. Any belts mentioned below for the transport of cut hemp stems are preferably of a lighter design. The rather concern guide belts, instead of lifting belts.

Hemp can grow extremely high. At the same time, a swath should preferably be narrow enough to be easily turned and picked up. After all, long stems in wide swaths run the risk of becoming knotted and crumpled. This decreases the quality. Most preferably, the swaths have an individual width of up to about 1 m to 1.2 m. This makes it possible to turn and/or pick up the swaths with machines, similar to the machines already used in flax harvesting. The further processing into a hemp fibre can then also be carried out with largely similar machines, which is an enormous advantage.

In a further or alternative embodiment, mowing takes place on one or more levels. In a further or alternative embodiment, the hemp is cut on at least two levels to form lower and upper stem parts. This leads to shorter stem parts that are more manageable. According to a non-limitative embodiment, at least two cutting bars are provided for this, at two cutting heights, and optionally also a further cutting bar for topping (see below). Preferably, the different cutting heights can be set individually.

In a further or alternative embodiment, the hemp is cut in a vertical position, at the aforementioned levels. In a further or alternative embodiment, the hemp is cut approximately simultaneously on both levels. It is therefore a simple and efficient technique. As a result, the device can also be made compact.

In a further or alternative embodiment, the upper stem parts are optionally stripped of corresponding plant tops. It is also possible to collect the plant tops separately. The upper stem parts therefore may or may not also comprise the plant tops. These plant tops are rich in CBD. It is therefore advantageous that they can be processed separately for medical and paramedical applications. As stated above, an additional cutting bar is optionally provided for this.

Optionally there are one or more cutting bars at the top to cut the tops off the hemp so that the upper stem parts are even in length. At the bottom of the device, at least two cutting bars are provided to cut the hemp in half lengthwise.

Incidentally, mowing can take place just before the stem parts engage between the belts, roughly simultaneously, or just after. The invention is not limited to this. Mowing can be done, for example, via a double knife bar, or via one or more rotating blades. The invention is not limited to any of these.

In a further or alternative embodiment, the lower and upper stem parts have substantially the same length. Preferably, therefore, there are no shorter and longer stem parts. Stem parts within one swath therefore have approximately the same width. That is to say, it is not the nature of the plant parts (e.g. leaf-free lower stems on the one hand and upper stems with leaves on the other) that determines where the hemp is cut, as in EP 0 941 649. Rather, it concerns a largely uniform and maximised length of the stems within a swath and between the swaths (regardless of how the swaths are created). A uniform length facilitates further operations such as turning, picking up and later processing into fibres. Furthermore, it is important that this uniform length is as large as possible for maximum fibre length. However, the stem parts should also not be too long, so that they are still manageable. These considerations are taken into account when determining whether hemp stems are cut in one, two or more (e.g. three, four, five, etc.) stem parts. Preferably, it is ensured that the maximum length of the stem parts is about 80 cm to 140 cm, most preferably 100 cm to 120 cm.

If cutting is done on more than two levels, for example on three levels, preferably all stem parts (lower, upper, intermediate) have essentially the same length.

In a further or alternative version, the lower and upper stem sections are laid down per pass in one or more adjacent swaths. For example, in at least two adjacent swaths.

In a further or alternative embodiment, the lower stem parts are laid down in a first swath, with upper stem parts being laid down in an adjacent swath. In general, the vertical stems can be divided into two or more stem parts, which are combined in one swath per level and which are laid back down in the same number of swaths.

In a further or alternative embodiment, per pass, the stem parts (e.g. the lower and the upper stem parts) of a first sub-strip are deposited in a first swath, wherein the stem parts of an adjacent sub-strip are laid down in an adjacent swath. A 'pass' is to be understood as the total strip cut and deposited in swaths in each pass of the device/machine. This strip is divided into several sub-strips. Reference is made to the non-limiting embodiment of FIG. 2A.

In a further or alternative embodiment, the lower and upper stem parts are combined per pass into an at least two-layered swath. In a further or alternative embodiment, said stem parts have a length which is less than 1.5 m, preferably less than 1.4 m, more preferably less than 1.3 m, more preferably less than 1.2 m.

In a further or alternative embodiment, the stem parts are held at any level between crossed conveyor belts and/or conveyor chains and are subsequently rotated 90° from vertical to horizontal, with the stem parts optionally being taken over one or more times by other belts, straps and/or chains, and deposited in parallel swaths on the field. Preferably, this concerns a net rotation of about 90°. The deposited stem parts lie mainly transverse to the direction of travel.

In summary, the method according to the first aspect may comprise the following steps:

Hemp is cut in one or more layers (such as two layers), the stems are held between crossed conveyor belts to be rotated 90° from vertical to horizontal, optionally taken over one or more times by other belts, and deposited in parallel swaths on the field.

The machine (for carrying out the method) can be a self-propelled or a towed or a carried machine.

An additional cutting bar can optionally be used to cut off the tops of long hemp. These can fall freely or be collected and removed.

It is not necessary but desirable that all cutting bars are adjustable in height, in order to adjust the cutting height as well as the length of the cut hemp as desired. Preferably one or more cutting bars are adjustable in height. However, this is not necessarily the case.

The width of the machine can be carried out for one or more swath widths, whereby in the draft of the machine it can be chosen to form one swath of one horizontal layer of the row width, but also to form a swath of both layers of a divided row width.

The machine can also contain additional functions, such as collecting flowers, seeds or leaves, crushing stems (to facilitate retting), sliding tables to adjust the swath position, etc.

In a second aspect, the Invention relates to a device for harvesting textile hemp, the device comprising:
- at least one horizontal mowing means, configured to mow hemp at a predetermined height, and
- crossed conveyor belts and/or conveyor chains to clamp cut hemp stems in parallel and rotate them from vertical to horizontal,
- which device is further adapted for depositing the hemp stems mainly transversely and mutually parallel in at least one swath.

Optionally, the device is specially adapted to perform the method according to the first aspect of the invention. The same features and advantages can thus be reiterated.

A suitable mowing means is, for example, a double knife bar. However, the invention is not limited to this.

In a further or alternative embodiment, the device further comprises at least two horizontal mowing means arranged substantially one above the other, and further belts, straps and/or chains for turning the cut stem parts transversely, to form a swath.

The advantage of the invention is that the device and method comprise elements of mowing (grasses, grains, etc.) as well as of harvesting flax in parallel swaths.

The combination of mowing (flax is pulled out) and conveyor belts to clamp and thus keep the stems parallel (which one does do with flax) is new and not known in the prior art. The application is also completely new for hemp. Combining with immediately cutting in half on the field when harvesting is also not known.

As with flax, the stems should be deposited in swaths with parallel stems when harvesting.

In this way it can be turned on the field afterwards to optimise the retting process and rolled up in parallel to later be decorticated in a scutching machine (separation of fibres and woody fraction).

The hemp plant grows to more than 2 m in height, therefore it is recommended to already cut the stems in half during harvesting (max. ±1200 mm) in order to allow it to be scutched according to current working methods.

Apart from the above, the invention can further be described by means of the following, non-limitative embodiments:

1. A method of harvesting textile hemp, the method comprising mowing the hemp and wherein the cut stems are optionally held between crossed conveyor belts to subsequently be rotated 90° from vertical to horizontal, optionally taken over one or more times by other belts, and deposited in parallel swaths on the field.
2. Method according to embodiment 1, wherein the mowing takes place on one or more levels.
3. Method according to embodiment 2, wherein at each level the stems are held between crossed conveyor belts and then rotated 90° from vertical to horizontal, taken over one or more times by other belts, and deposited in parallel swaths on the field.
4. A device for harvesting textile hemp comprising crossed conveyor belts for clamping hemp in parallel and optionally one or more cutting bars.

Optionally, the embodiments given herein can be further applied in combination with one or more of the further or alternative features, as listed throughout the above description.

In what follows, the invention is described by way of non-limiting figures illustrating the invention, and which are not intended to and should not be interpreted as limiting the scope of the invention.

Application of the Device

Figures 2A, 2B:
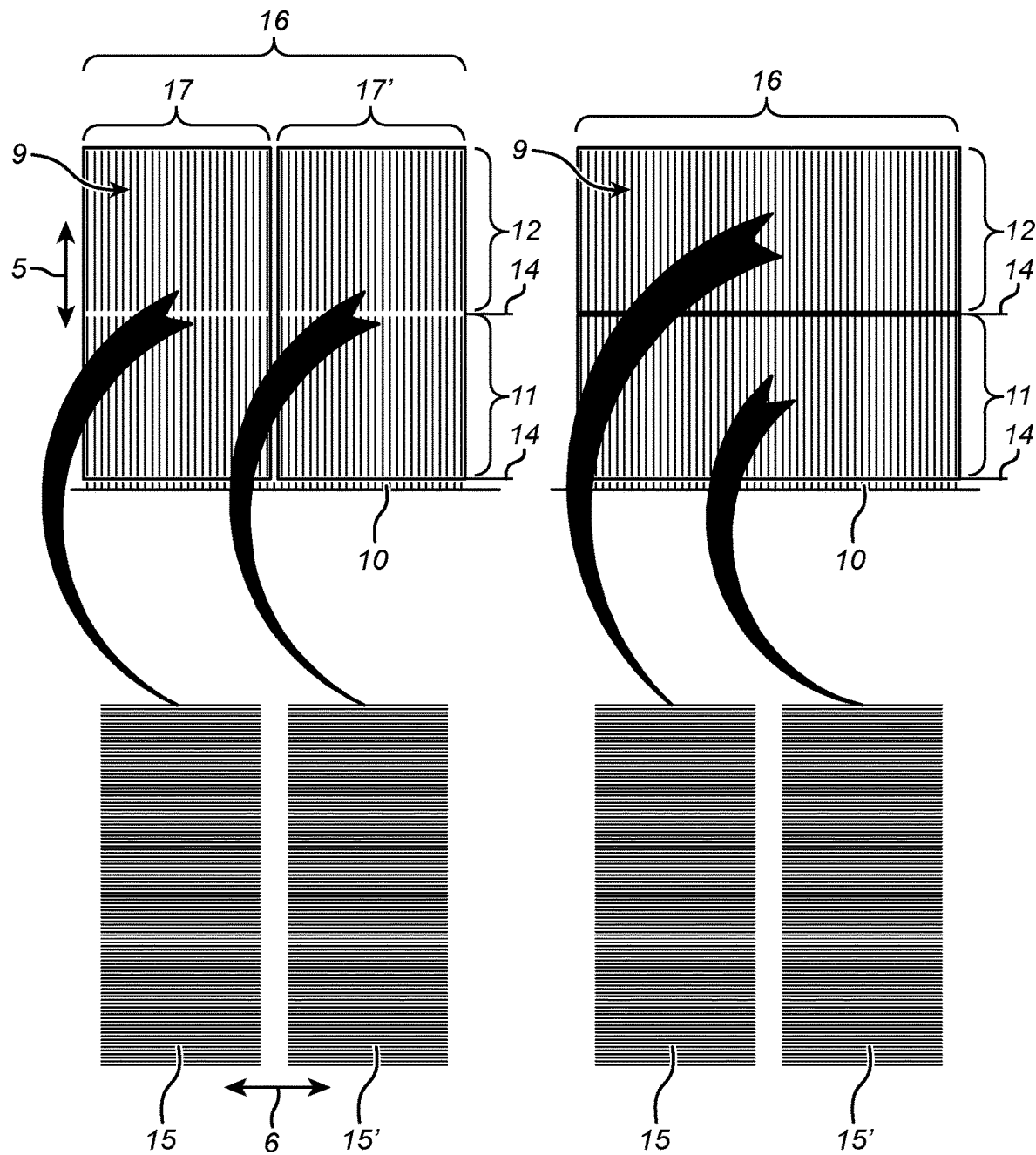
FIGS. 2A-B schematically illustrate mowing hemp and depositing two swaths, according to two possible embodiments.

FIG. 1 shows a schematic side view of a device 1 for harvesting textile hemp 9. The device 1 comprises at least two horizontal cutting bars 8 for mowing the hemp 9 at two corresponding cutting heights 14. The hemp 9 is cut upright, roughly simultaneously on both levels 14. Thereby lower stem parts 11 and upper stem parts 12 are obtained. A hemp stubble 10 remains on the field. Optionally, the upper stem parts 12 are topped by means of a further cutting bar 8' at topping height 14'. This makes it possible to process any plant tops 13 of the hemp 9 separately. Furthermore, the device 1 is per level also provided with crossed conveyor belts 2 to engage and clamp the cut hemp stems 11, 12 (or stem parts 11, 12—depending on the number of levels) in parallel, bring them from vertical 5 to horizontal 6 (=transverse to the figure), precisely using the said intersection 18. Subsequently, conveyor belts and tables 7 will be used to guide mowed and cut hemp 9 to the ground 3 in preferably parallel swaths 15. As mentioned, optionally one or more cutting bars 8' are present at the top to cut off the tops 13 of the hemp 9, so as to ensure the top row is uniform in length. Generally, the lower stem parts 11 and the upper stem parts 12 (with or without plant top 13) preferably have substantially the same length. At the bottom of the device, at least two cutting bars 8 are provided to cut the hemp 9 in half lengthwise. As can be seen in the figure, the lower stem parts 11 and the upper stem parts 12 combined become a two-layered swath 15. Per pass (not shown), there may be several such swaths 15, located next to each other. Reference is made to FIGS. 2A-B. The whole as shown in FIG. 1 can moreover form part of a self-propelled or towed unit, on which additional functional elements may be located.

FIGS. 2A-B schematically illustrate mowing hemp 9 and depositing two swaths 15, according to two possible embodiments. The hemp 9 is cut at two different cutting heights 14, to form lower and upper stem parts 11, 12. This is schematically shown each time in the front views, at the top of FIG. 2A-B. The cut stem parts 11, 12 are then combined in the manner described below into swaths 15, 15'. This schematically shown each time in the top views at the bottom of FIG. 2A-B. The stem parts 11, 12 extend horizontally 6, transverse in the swaths 15, 15'.

In FIG. 2A, the pass 16 is divided into two adjacent sub-strips 17, 17'. Lower and upper stem parts 11, 12 of the left-hand sub-strip 17 are laid on top of each other, and thus combined into a left-hand swath 15. Lower and upper stem parts 11, 12 of the right-hand sub-strip 17' are also laid on top of each other and combined into a right-hand swath 15'. Optionally this corresponds to the situation shown in FIG. 1. Both swaths 15, 15' basically consist of two layers.

In FIG. 2B, the top stem parts 12 are combined per pass 16 into a left-hand swath 15. The lower stem parts are combined per pass 16 to form a right-hand swath 15'. Optionally, the device 1 provides (sliding) tables for this purpose which can adjust the position of a swath 15, 15'. Both swaths 15, 15' are basically single-layered.

Cutting long stems of hemp 9 into at least two stem parts 11, 12 has the important advantage that it is possible to work with shorter, and thus more manageable and/or scutchable lengths. This is advantageous for drying and retting, among other things. It is also advantageous in further operations such as turning and/or picking up the swaths 15, 15'.

Optionally, the width of a pass 16 roughly corresponds to the added height of the lower and upper stem parts 11, 12, or the pass 16 is slightly wider. This provides enough space to deposit the swaths 15, 15'.

Figure 3:
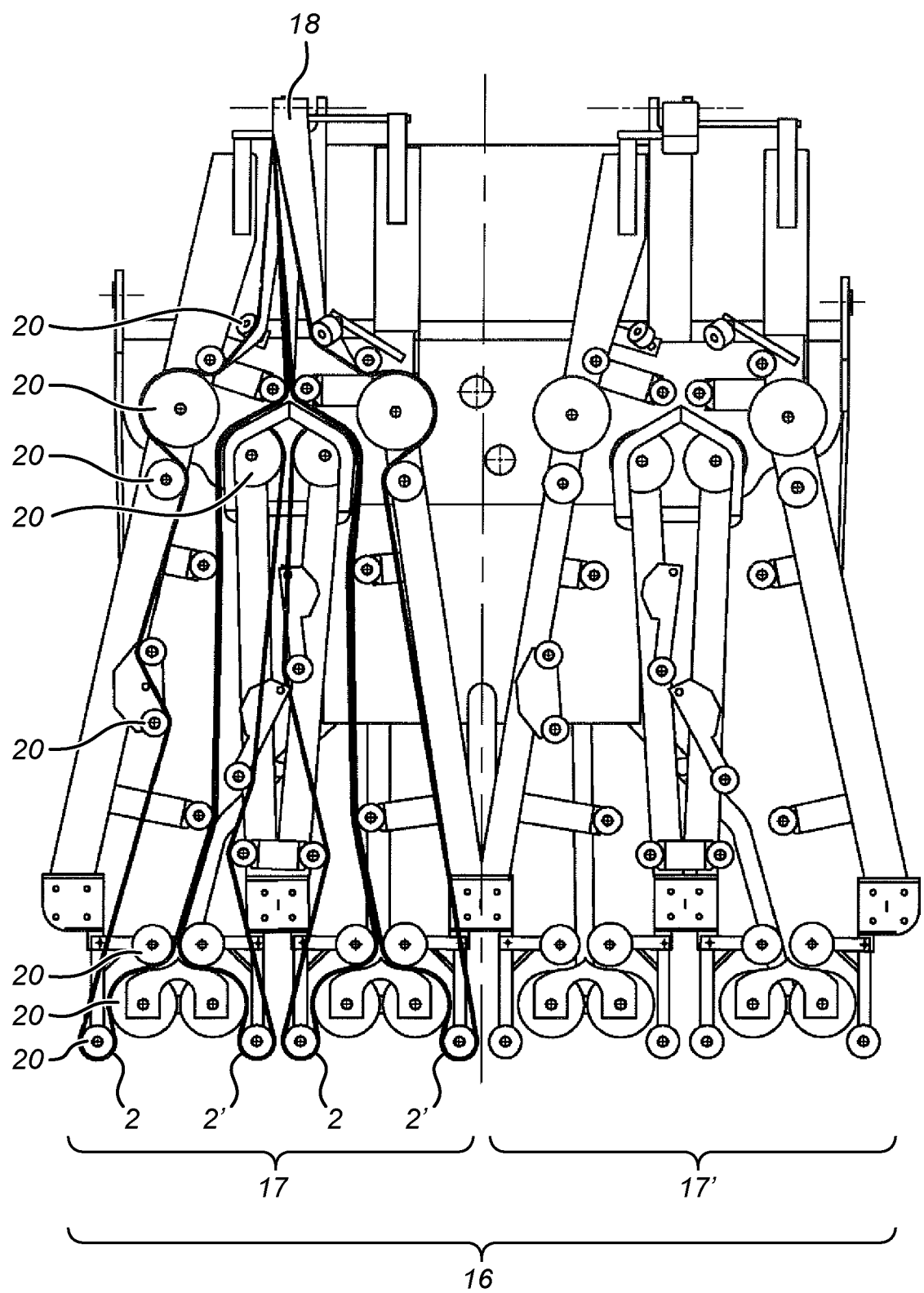
FIG. 3 shows a top view of a mechanism with crossed conveyor belts for engaging and holding the cut stem parts in parallel.

FIG. 3 shows a top view of a possible mechanism with crossed conveyor belts 2 for engaging and holding the cut stem parts in parallel. The conveyor belts 2 are shown on the left; they were left out on the right. The mechanism further provides a plurality of roller bodies 20 for guiding the belts 2.

At the front, the cut stem parts are vertically engaged between a roller body 20 and a belt 2. Further on, two such belts 2, 2' are brought together. The stem parts are clamped between them and transported further. Further along still, two pairs of such belts 2, 2' are brought together. A whole sub-strip 17 of the pass 16 is thereby combined. During this transport, the stem parts are mainly held vertically, and mutually parallel. Finally, the belts 2 form another intersection 18 (shown at the top). The hemp stems are thereby rotated about 90° from vertical to horizontal.

Preferably, such mechanisms are provided per level to engage the mown stem parts per level and combine them into swaths.

The numbered elements in the figures are:
1. Device
2. Conveyor belts/chains
3. Ground
4. Stem part
5. Vertical
6. Horizontal
7. Conveyor belt or transport table
8. Cutting bar
9. Hemp
10. Hemp stubble
11. Lower stem part
12. Upper stem part
13. Plant top
14. Cutting height
15. Swath
16. Pass
17. Sub-strip
18. Intersection
19. Conveyor belt
20. Roller body

The invention claimed is:

1. A method of harvesting hemp comprising:
   mowing the hemp with at least two cutting bars on at least two levels to produce cut hemp stems that have a maximum length of about 80 cm to 140 cm, wherein the cut hemp stems are selected from the group consisting of lower stem parts and upper stem parts;
   rotating the cut hemp stems about 90° from vertical to horizontal; and
   depositing the cut hemp stems substantially transversely and mutually parallel in at least one swath.

2. The method according to claim 1, wherein the hemp is cut in a vertical position at the at least two levels.

3. The method according to claim 1, wherein the hemp is cut approximately simultaneously at the at least two levels.

4. The method according to claim 1, wherein the upper stem parts are stripped of corresponding plant tops.

5. The method according to claim 1, wherein the lower stem parts and the upper stem parts have substantially the same length.

6. The method according to claim 1, wherein the lower stem parts and the upper stem parts are deposited in at least two adjacent swaths per pass.

7. The method according to claim 6, wherein the lower stem parts are deposited in a first swath, and wherein the upper stem parts are deposited in an adjacent swath.

8. The method according to claim 6, wherein per pass the stem parts of a first sub-strip are deposited in a first swath, and wherein the stem parts of an adjacent sub-strip are deposited in an adjacent swath.

9. The method according to claim 1, wherein the lower stem parts and the upper stem parts are combined per pass in an at least two-layered swath.

10. The method according to claim 1, wherein the cut hemp stems have a length less than 140 cm.

11. The method according to claim 1, wherein the cut hemp stems are held at any level between crossed conveyor belts and/or conveyor chains and are subsequently rotated 90° from vertical to horizontal, with the cut hemp stems optionally being taken over one or more times by other belts, straps and/or chains, and deposited in parallel swaths on a field.

12. A device comprising:
   at least two horizontal mowing means at a minimum of two predetermined heights; and
   at least two crossed conveyor belts and/or conveyor chains to clamp cut hemp stems in parallel and rotate them from vertical to horizontal and to deposit cut hemp stems substantially transversely and mutually parallel in at least one swath.

13. A method comprising:
   providing the device of claim 12,
   mowing the hemp with the device to produce the cut hemp stems that have a maximum length of about 80 cm to about 140 cm, wherein the cut hemp stems are selected from the group consisting of lower stem parts and upper stem parts;
   rotating the cut hemp stems about 90° from vertical to horizontal with the device; and
   using the device to deposit the cut hemp stems substantially transversely and mutually parallel in at least one swath.

* * * * *